April 12, 1949.   H. D. GIFFEN ET AL   2,466,803
TELEMETRIC SYSTEM
Filed Aug. 14, 1944   2 Sheets-Sheet 1
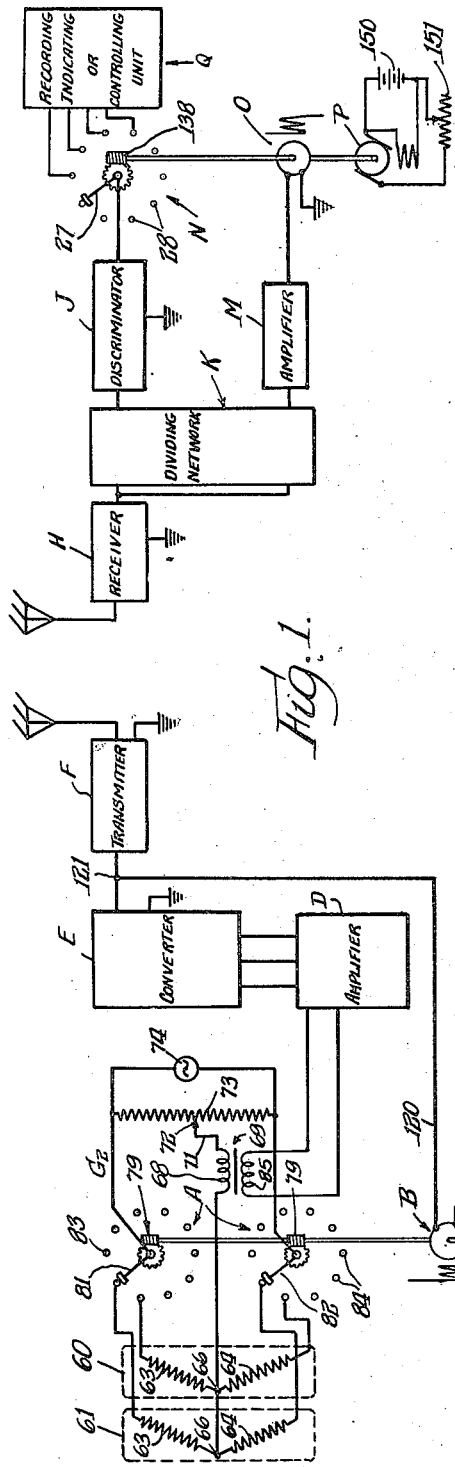
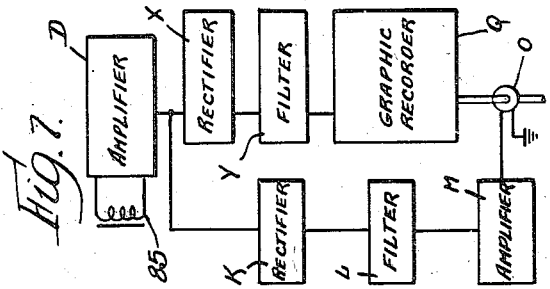
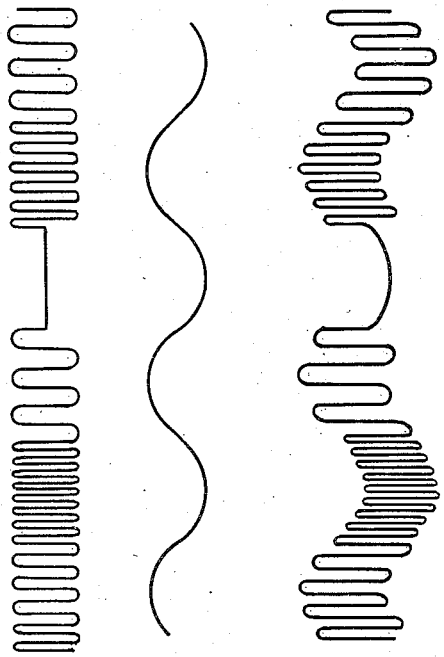
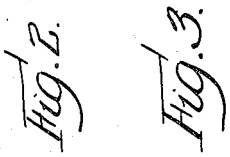
INVENTORS.
Harvey D. Giffen
and Thomas B. Thomson Jr
Fred Gerlach atty.

April 12, 1949.  H. D. GIFFEN ET AL  2,466,803
TELEMETRIC SYSTEM
Filed Aug. 14, 1944    2 Sheets-Sheet 2
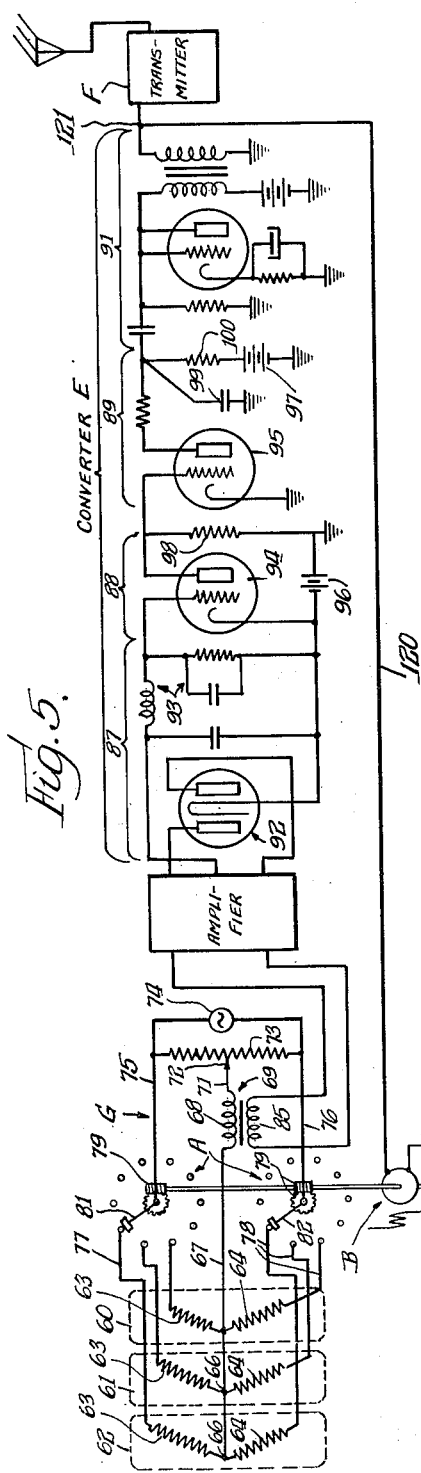
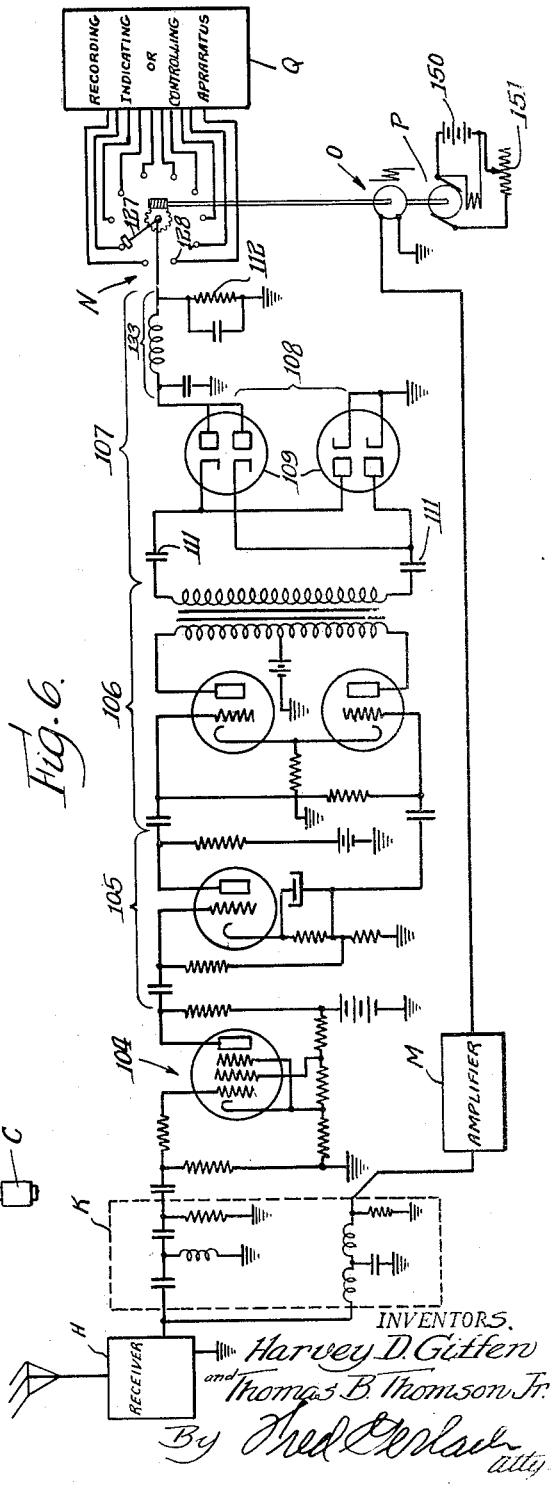
INVENTORS.
Harvey D. Giffen
and Thomas B. Thomson Jr.
By Fred Gerlach
atty Patented Apr. 12, 1949

2,466,803

UNITED STATES PATENT OFFICE 2,466,803

TELEMETRIC SYSTEM

Harvey D. Giffen, Theodore, Ala., and Thomas B. Thomson, Jr., San Diego, Calif., assignors to Consolidated Vultee Aircraft Corporation, San Diego, Calif., a corporation of Delaware Application August 14, 1944, Serial No. 549,442

6 Claims. (Cl. 177—351)

This invention relates in general to the transmission of intelligence from a remote point, and, more particularly, to a method and apparatus for effecting the synchronization of an element at the source of the intelligence with an element at the destination of the transmitted intelligence to thereby maintain the system in synchronism.

In a preferred form of the invention the intelligence being transmitted is the changes occurring in detector gauge devices, the gauge devices being associated with the appliance (as, for example, an aeroplane) being investigated and being adapted to be affected by changes occurring in the condition or status of the appliance. The gauge devices may be of a variety of types and capable of detecting changes in temperature, pressure, velocity, stress, etc., dependent on the type of investigation being conducted and the kind of information desired. According to this form of invention the changes in a plurality of gauge devices are transmitted in rapid and recurring sequence by frequency modulation of a carrier wave and over a single channel to a remote point where the various changes may be noted simultaneously with their occurrence. In the operation of the invention it is preferable that a plurality of indicating or recording elements for receiving the transmitted signals in like rapid and repeated sequence be in synchronism with the means at the transmitting station in order that a proper and correct interpretation or use may be had of the transmitted intelligence.

An object of the present invention is to provide a novel method of effecting the synchronization of two remotely located mechanisms, together with an apparatus for utilizing the method.

Another object of the present invention is to provide a novel method of producing a synchronizing signal in a modulated carrier wave.

Another object of the present invention is to provide a novel means for synchronizing two remotely located mechanisms.

Another object of the present invention is to provide a novel means for superimposing a synchronizing signal onto a multiple frequency modulated carrier for transmission over a single channel.

Another object of the present invention is to provide in a system wherein a plurality of detector gauge readings are transmitted in the form of proportional frequencies over a single channel, means for transmitting a control frequency over the same channel, which latter frequency may be used to effect synchronization between two remotely located mechanisms.

Another object of the present invention is to provide novel means for combining a number of frequency signals for transmission over a single channel with one of the frequencies to be used for synchronizing two remotely located mechanisms.

Another object of the present invention is to provide a novel means whereby a synchronous signal may be combined with a variety of types of intelligence such as voice, code, music, etc., for transmittal therewith over the same channel used by the particular type of intelligence.

Another object of the present invention is to provide in a system wherein a series of varying frequency signals are transmitted over the same channel, and in rapid repeated sequence, a novel means for producing and using an audio-frequency for effecting synchronization of two remote mechanisms.

Other objects and advantages will become readily apparent from the following detailed description taken in connection with the accompanying drawings wherein:

Fig. 1 is a diagrammatic representation of a preferred form of the invention.

Figs. 2, 3 and 4 illustrate wave forms in different portions of the receiving means.

Fig. 5 shows in more detail the circuit of the transmitting means.

Fig. 6 shows in more detail the circuit of the receiving means; and

Fig. 7 is a diagrammatic representation of a modified form of the invention.

The invention, in the form selected for purposes of disclosure, will be considered as comprising two divisions, the first division involved with the creation and transmission of intelligence and the second with the reception and utilization of the transmitted intelligence. These divisions embody means for effecting synchronization between apparatus involved in each division.

The transmitting means, as illustrated in Figs. 1 and 5 and in its essentials, embodies a plurality of gauge devices 60, 61, 62, a scanning switch A, an A. C. generator B, a driving motor C, an amplifier D, a converting unit E and a transmitter F. The gauge devices are utilized with the transmitting system and feed signals or impulses thereto. When on an aeroplane, the gauge devices are located at various stations thereon so as to be individually actuated by changes in condition of the parts or accessories with which they are associated. The gauges used are preferably of the type that can be connected into an alternating current Wheatstone bridge G as two arms thereof and changes occurring at the stations where the gauges are located will produce an off balance in the Wheatstone bridge to provide a frequency modulated A. C. bridge carrier which is changed in the converter to a varying frequency which, in turn, is fed into the transmitter to modulate the transmitted carrier wave.

The receiving means comprises a receiver H, a discriminator J, a dividing network K, an amplifier M, a scanning switch N, a synchronous motor O, a power motor P and an apparatus Q which may be of a recording, indicating or a controlling type, depending upon how the signals produced by the detector gauges are to be utilized. Preferably, the apparatus embodies a plurality of actuable elements, one corresponding to and operable in accordance with changes in each gauge device. The discriminator J is understood to embody, along with the discriminator unit, a group of associated elements, such as a limiter, a phase inverter, and a power amplifier, and will be described hereinafter in greater detail.

The scanning switch N may be of the same general form as one part of scanning switch A, and includes a rotating switch arm and a like number of contacts. It is the purpose of this invention to synchronize the operation of switch N with that of switch A so that the signals received at the apparatus Q are in proper correlation with the signals sent out from the various detector gauges.

The frequency signal as received by receiver H is of the form shown in Fig. 4 and is sent from the receiver H into two channels, one channel leading through the discriminator J and the switch N to the apparatus Q, and the other channel leading through the units K and M to the synchronous motor O.

The frequency signal of the form shown in Fig. 4 is first passed through the dividing network K which separates the signal of Fig. 2 from the signal of Fig. 3. The first signal (Fig. 2) is fed to the discriminator J and thence to the scanning switch N and the apparatus Q. The signal of Figure 3 after amplification in the power amamplifier M, is used to operate the synchronous motor O which drives the scanning switch N. Thus the relationship between switch A and generator B is carried to the switch N and synchronous motor O to place switches A and N in synchronism. The motor P is used to furnish auxiliary power to operate switch N and so that the synchronous motor O need not be of as large a size as it would have to be if motor P were lacking.

It is possible with a system as disclosed herein to transmit the audio frequencies resulting from the actions of various detector gauges to a place where these frequencies may be stored, the means for storing these frequencies could be a disc record. The record may then be played back and the superimposed frequencies fed into the circuits leading to the scanning switch N and the synchronous motor O whereby switch N will move at the correct speed to pass the readings of the detector gauges to the apparatus Q. The above described course of action may be desirable when the investigator is pressed for time. Furthermore if a failure should occur at a station where the detector gauges are located the record can be repeatedly run to permit the detailed and exhaustive studying of the actions of the various gauges up to the point of failure. It will also be possible to pass the signals received through an apparatus Q of the control type to duplicate the test on a specimen up to the point of failure.

In the system of the present invention it is not necessary that the intelligence being transmitted be of the character produced by detector gauges for the synchronizing signal may be superimposed on a channel adapted to carry voice, music, code and the like. It is apparent from this that since the synchronizing signal can be carried over a channel adapted to carry voice, code and the like that the system of this invention thus has the characteristic of being able to superimpose a synchronizing signal onto a band of interrupted frequencies, for voice and code are representative of bands of interrupted frequencies.

A straight line section is shown in the frequency wave of Figure 2. This straight line section is merely to show that even though a dead spot appears in the wave form whether deliberately effected or whether caused by the failure of a detector gauge a synchronizing signal can be combined therewith to obtain the desired results.

As illustrated in Figs. 1 and 5, the detector gauge devices are shown as embodying two resistance arms 63 and 64 which will effect two arms of the Wheatstone bridge circuit G and which are joined at a common point 66. The common points of the various gauges are connected together and a lead 67 connects them to one end of the primary coil 68 of a coupling transformer 69. A second lead 71 joins the opposite end of the coil 68 to a movable contact 72 of a potentiometer 73, the two ends of which form the other two arms of the Wheatstone bridge G. An alternating current generator 74 is connected across the outer ends of the potentiometer 73.

The gauge devices 60, 61 and 62 (as well as others, not shown) are adapted to be connected, one at a time, and in rapid and repeated succession as arms in the bridge circuit G by means of leads 75 and 76, and leads 77 and 78, and the switch mechanism A. This switch mechanism, as illustrated herein, comprises a pair of rotating switch arms 81 and 82, the outer ends of which pass over and engage, successively, two sets of contacts 83 and 84, one set being arranged annularly about the axis of rotation of each of the switch arms. The leads 77 extending from one end of each gauge device are connected to contacts 83 and the leads 78 extending from the opposite end of the gauge devices are connected to the second set of contacts 84. By rotating the switch arms 81 and 82 in synchronism the gauges are connected individually and in predetermined sequence into the A.C. bridge circuit G.

The motor C effects the rotation of the switch arms 81 and 82 at a constant rate through worm gearing 79 so that each gauge device is connected into the bridge circuit with predetermined frequency. The number of switch contacts embodied in each of the contact sets 83 and 84 can be varied in accordance with the number of gauges it is desired shall be used. With the switch mechanism A shown herein, ten gauge devices can be employed. The invention is not limited to a switch of the type shown or to a mechanical switch for it is obvious that the switch may assume a variety of forms either mechanical, electrical or electronic.

A coil 85 forms the secondary for the coupling transformer 69 and is adapted to carry the A.C. bridge carrier current from the generator, as modulated by the successive gauges, to an amplifier D. The modulated A.C. signal, after amplification, is then passed through the converter E. The circuit of this converter may be subdivided, as shown in Fig. 5, into the several sections 87, 88, 89 and 91 to segregate the various elements thereof for ease of description. Section 87 includes a conventional rectifier 92, which may be a 6ZY5 rectifier tube, and which rectifies the amplified signal. Associated with the rectifier 92 is a filter 93, of conventional design, and which acts to eliminate ripples that may occur. The direct current variable voltage signal passed by filter 93 is fed to the portion of the circuit comprising sections 88 and 89. It is here that the variable voltage signals provided by the various gauge devices are converted into related frequencies. This conversion portion of the circuit comprises two electron tubes 94 and 95; the first tube 94, shown in section 88, is of the 6SK7 type and the second tube 95, in section 89, is a gas triode tube of the 884 type. Tube 94 acts as a phase reverser and corrects for non-linearity in the 884 tube. A battery 96 provides the power for tube 94, the 6SK7, and a battery 97 provides the power for tube 95. A resistance 98 associated with tube 94 develops a voltage of the dimension of the voltage of the signal and which is applied to the grid of tube 95. Tube 95 is an oscillator tube. This tube is associated with a resistance 100 and a condenser 99 to effect a variable oscillator. Condenser 99 and resistance 100 will determine the fundamental range of the frequency generated by tube 95, and in this case it is assumed to be between 1000 cycles and 4000 cycles. If the range is desired changed, another condenser and resistance will be substituted for condenser 99 and resistance 100 and of appropriate values to obtain the range desired.

The changes in amplitude effected by the various gauge devices will thus be fed into the conversion portion of the circuit and will act to cause the oscillator, embodying tube 95, resistance 100 and condenser 99, to change its rate of oscillation. The gauges are so constructed that in their condition of maximum unbalance they will cause the oscillator to change its rate of oscillation to 4000 cycles. If there were no change in a gauge device and therefore no signal passed into the converted E there would still be a signal being passed to the transmitter F and this would be the frequency of 1000 cycles generated by the variable oscillator. Thus as a gauge device varies it controls a frequency which varies between 1000 and 4000 cycles in proportion to the magnitude of the stress or stimuli acting upon the gauge device. However, the converter E can be of any type provided it can accept a signal as produced by a detector gauge device and change this signal into a related audio frequency. The audio frequency signal is then fed into section 91 which comprises a conventional amplifier which will build up the frequency received to the proper volume required to operate or modulate the transmitter to the point where readings are to be recorded.

The motor C which drives the switch A is also adapted to drive the generator B. A lead 120 connects the generator B into the line between the converter unit E and the transmitter F at a point 121. The frequency produced by the generator B will be directly related to the speed of switch A and will assume a form of the general type shown in Figure 3 and this frequency will be superimposed on the signal shown in Figure 2 to produce the mixed signal of Figure 4. It is this mixed signal that is sent by the transmitter F to the receiver H.

The receiver H receives the transmitted audio frequency and passes it into the conventional dividing network K whereby the signal produced by generator B is separated from the signal emitted by the converter unit E. The latter signal (Fig. 2) is passed first into a limiter 104 (Fig. 6) of conventional construction, and which serves to make all the incoming signals of equal amplitude; the signals are then passed through a phase inverter 105, of conventional design; and into a conventional power amplifier 106, which will act to provide more undistorted power. The signal is then passed to a discriminator 107 wherein the frequencies will be reconverted into proportional D. C. voltages. The discriminator 107 embodies a bridge rectifier 108 comprising two electron tubes 109, of the 6H6 type. A pair of discriminator condensers 111 are associated with the electron tubes 109. Two condensers 111 are used to effect a balance in the rectifier circuit though one may be used if the value of that one were changed proportionately. The frequencies received at the discriminator condensers 111 will have a direct relation to the voltage produced across a resistance 112; that is, changes in the reactance of condensers 111 will effect proportional changes of voltage applied across resistance 112. The voltages across resistance 112 will be directly related to the voltages provided by the detector gauges 60, 61 etc. A filter 133 of conventional design is provided to eliminate ripples that may occur in the signals.

Thus the changes in amplitude effected by the gauges 60, 61 and 62 are converted into proportional frequencies on passage through the converter E and, after transmission, are reconverted, in the discriminator J, into voltages, proportional to the transmitted frequencies. These voltages are then applied at switch N having a rotating arm 27 and a plurality of contacts 28 and through which the voltages may be fed to the apparatus Q which may be of a recording, indicating or a controlling type dependent on whether the signals produced by the detector gauges are desired to be recorded, or are to be used to operate an indicating instrument or are to control the operation of any designated mechanism. If the changes are to be recorded an apparatus of the type disclosed and claimed in our application Ser. No. 549,441, filed August 14, 1944, may be used.

It is the purpose of this invention to provide a method and means for synchronizing the movements of arm 27 of switch N with the arms 81 and 82 of switch A so that the signals received at apparatus Q are properly correlated with the signals sent out by the various detector gauge devices. This is accomplished by the generator B and by the dividing network, as will now be described.

As stated above, the received signals are passed into two channels. In the first channel the signals are fed through the discriminator J, as has been described. The signal produced by the generator B (after passing through the dividing network K) will be fed through the amplifier M, (which brings it up to an effective volume) to the synchronous motor O which drives the switch arm 27 through suitable gearing 138. Thus the relationship between switch A and generator B is carried to synchronous motor O to place the switches N and A in synchronism. The invention, it is pointed out, is not to be limited to the employment of a switch N having a rotating arm 127 but may employ a switch of any construction which is operable to perform the desired function.

To furnish some of the power for driving the switch N the motor P may be connected in tandem with the synchronous motor O, as illustrated in the drawings. Preferably, the motor P is of an adjustable speed type, the one herein illustrated being arranged to be operated on a direct current source of power indicated by battery 150 in a circuit embodying a rheostat 151. In this way the speed of the motor P can be adjusted so that it carries the desired portion of the load of driving the switch N, the synchronous motor O then serving principally as a means for controlling the speed of operation of the switch N and keeping it in step with the switch A.

In the use of the word "telemetering" it is to be understood that our invention is not to be limited to systems utiliizng a radio transmitter and receiver but that the invention also can be applied to systems wherein there is a direct wire connection between the source of intelligence and the recording means as shown in Fig. 7.

In Fig. 7 a system is shown having a direct connection between the amplifier D and the circuit of the recording means Q. The converter E, transmitter F and receiver H together with discriminator J and its associated elements 104, 105 and 106 are eliminated and in the place of the discriminator J and its elements are substituted a rectifier X and a filter Y to effect the conversion of alternating current into a direct current voltage to provide for the operation of the recorder Q.

It is also possible with the present invention to utilize the system of Figures 1 and 2 except for the transmitter and receiver, substituting a direct wire connection for these means but retaining the converter E and the discriminator J and its associated elements 104, 105 and 106. This direct wire system could be used where it was necessary to employ a very long wire as a connecting means and in which wire, because of its length, there would be a possibility of distorted signals being created.

It is thought that the invention and its numerous attendant advantages will be fully understood from the foregoing description; and it is obvious that numerous changes may be made in the form, construction and arrangement of the several parts without departing from the spirit or scope of the invention, or sacrificing its attendant advantages, the form herein disclosed being a prefererd embodiment for the purpose of demonstrating the invention; and we do not claim herein either the patentable combinations including specific means for controlling the production of high frequency oscillations in the transmitting system or of the transmitting system itself, the same being claimed in a co-pending application Serial No. 535,481 now abandoned; nor the patentable combination embodying particular features of the receiver and recorder mechanism, or the manner of operating the same, as claimed in a co-pending application Serial No. 549,440; nor the combination including particular features of the recording apparatus and the operation thereof, the same being claimed in a co-pending application Serial No. 549,441; nor the combination embodying specific means for accomplishing the frequency variation of signal impulses in repeated succession and the manner of so operating a telemetric system, as claimed in a co-pending application Serial No. 549,443; the present invention herein claimed residing in the combinations recited in the appended claims.

We claim as our invention:

1. A telemetric system comprising, in combination, a plurality of sending stations, a transmitter of high frequency oscillations, a modulating means for superimposing thereon in repeated sequence a series of variable frequency signals including a switch device, means for superimposing upon said modulated high frequency oscillations a second frequency which is in synchronism with the operation of said switch device, a receiver, means operable in accordance with changes at said sending stations and having a device corresponding to each sending station, means including a synchronous motor driven switch device for transferring the received signals in repeated sequence to the devices corresponding to the sending stations, and means for supplying power to said synchronous motor to maintain the two switch devices in synchronism comprising a dividing network for separating the modulated variable frequency signals from the second frequency, and means including an amplifier for amplifying the second frequency for use in operating said synchronous motor.

2. A telemetric system comprising, in combination, a plurality of sending stations, a transmitter of high frequency oscillations, a modulating means for superimposing thereon in repeated sequence a series of variable frequency signals including a switch device, means for superimposing upon said modulated high frequency oscillations a second frequency which is in synchronism with said switch device, a receiver, means operable in accordance with changes at said sending stations and having a device corresponding to each sending station, means including a synchronous motor driven switch device for transferring the received signals in repeated sequence to the devices corresponding to the sending stations, and means for supplying power to said synchronous motor to maintain the two switch devices in synchronism comprising a dividing network for separating the modulated variable frequency signals from the second frequency, and means for feeding said second frequency to said synchronous motor.

3. A telemetric system comprising, in combination, a plurality of detector gauge devices, a radio frequency transmitter, an oscillator connected to modulate the radio frequency carrier wave, means for varying the frequency of said oscillator in rapid and repeated sequence and in accordance with changes in said gauge devices including a transmitter switch device operating to connect in said gauge devices in such sequence, means for superimposing upon said modulated oscillations a frequency which is in synchronism with said switch device, means operable in accordance with changes in said gauge devices and having an element corresponding to each gauge device, means including a synchronous motor driven switch device for transferring the modulated oscillations in regular recurring sequence to said elements simultaneously with the connection of said gauge devices, and means for operating said synchronous motor driven switch device in step with said transmitter switch device comprising a dividing network for separating from the modulated carrier wave the frequency which is in synchronism with said transmitter switch device and means including an amplifier for connecting said network to said synchronous motor.

4. A telemetric system comprising, in combination, a plurality of detector gauge devices, a radio frequency transmitter, an oscillator connected to modulate the radio frequency carrier wave, means for varying the frequency of said oscillator in rapid and repeated sequence and in accordance with changes in said gauge devices including a transmitter switch device operating to connect in said gauge devices in such sequence, means for superimposing upon said modulated oscillations a frequency which is in synchronism with said switch device, means operable in accordance with changes in said gauge devices and having an element corresponding to each gauge device, means including a synchronous motor driven switch device for transferring the modulated oscillations in regular recurring sequence to said elements simultaneously with the connection of said gauge devices, and means for operating said synchronous motor driven switch device in step with said transmitter switch device comprising a dividing network for separating from the modulated carrier wave the frequency which is in synchronism with said transmitter switch device and means connecting said network to said synchronous motor.

5. A telemetric system comprising a synchronous motor and mechanism drivingly connected therewith, at a receiving station, progressively operating switch mechanism at a remote transmitting station, and means to drive said motor and its connected mechanism in synchronism with said switch mechanism, comprising signal transmitting means at said transmitting station for transmitting a signal varying in frequency in accordance with changing conditions being investigated at the transmitting station, associated means to generate a monitor frequency impulse wave in synchronism with said switch mechanism and to superimpose said monitor frequency wave upon said varying frequency signal to modulate the same, means at said receiving station for receiving said modulated signal and to divide the monitor frequency and varying signal frequency components thereof, and means for controlling the operation of said synchronous motor in accordance with said divided monitor frequency wave.

6. A telemetric system comprising a synchronous motor and mechanism drivingly connected therewith, at a receiving station, progressively operating switch mechanism at a remote transmitting station, and means to drive said motor and its connected mechanism in synchronism with said switch mechanism, comprising signal transmitting means at said transmitting station for transmitting a signal varying in frequency in accordance with changing conditions being investigated at the transmitting station, associated means to generate a monitor frequency impulse wave in synchronism with said switch mechanism and to superimpose said monitor frequency wave upon said varying frequency signal to modulate the same, means at said receiving station for receiving said modulated signal and to divide the monitor frequency and varying signal frequency components thereof, means to amplify said divided monitor frequency component, and means responsive to said amplified component for controlling the operation of said synchronous motor.

HARVEY D. GIFFEN.
THOMAS B. THOMSON, Jr.

REFERENCES CITED

The following references are of record in the file of this patent:

UNITED STATES PATENTS

| Number | Name | Date |
| --- | --- | --- |
| 463,852 | Bradley | Nov. 24, 1891 |
| 1,505,158 | Martin | Aug. 19, 1924 |
| 1,576,195 | Junken | Mar. 9, 1926 |
| 1,714,967 | Wensley | May 28, 1929 |
| 2,039,405 | Green et al. | May 5, 1936 |
| 2,225,657 | Potts | Dec. 24, 1940 |
| 2,256,482 | Isbister et al. | Sept. 23, 1941 |
| 2,378,395 | Dickson | June 19, 1945 |